(12) United States Patent
Xu

(10) Patent No.: US 8,608,833 B2
(45) Date of Patent: Dec. 17, 2013

(54) SELECTIVE ABSORPTION OF GAS COMPONENTS IN CO-CURRENT CONTACTING APPARATUSES

(75) Inventor: Zhanping Xu, East Amherst, NY (US)

(73) Assignee: UOP LLC, Des Plaines, IL (US)

( * ) Notice: Subject to any disclaimer, the term of this patent is extended or adjusted under 35 U.S.C. 154(b) by 634 days.

(21) Appl. No.: 12/797,180

(22) Filed: Jun. 9, 2010

(65) Prior Publication Data

US 2011/0303089 A1 Dec. 15, 2011

(51) Int. Cl.
*B01D 47/14* (2006.01)
*B01D 53/18* (2006.01)

(52) U.S. Cl.
USPC ......... 95/213; 261/114.5; 261/114.1; 96/290; 96/296; 96/300

(58) Field of Classification Search
USPC ......... 95/213, 223, 198; 96/189, 355; 261/97, 261/110, 114.1, 114.5; 423/228, 229, 243, 423/573.1
See application file for complete search history.

(56) References Cited

U.S. PATENT DOCUMENTS

| | | | | |
|---|---|---|---|---|
| 3,290,025 A | * | 12/1966 | Engalitcheff, Jr. | ......... 261/140.1 |
| 3,446,595 A | | 5/1969 | Guerrieri | |
| 4,356,161 A | * | 10/1982 | McNamara et al. | .......... 423/230 |
| 4,504,426 A | * | 3/1985 | Chuang et al. | ............. 261/114.1 |
| 4,880,451 A | | 11/1989 | Konijn | |
| 5,024,686 A | | 6/1991 | Lerner | |
| 5,055,239 A | * | 10/1991 | Thomas | ..................... 261/112.2 |
| 5,223,183 A | | 6/1993 | Monkelbaan et al. | |
| 5,318,732 A | | 6/1994 | Monkelbaan et al. | |
| 5,364,604 A | * | 11/1994 | Spink et al. | ................... 423/210 |
| 5,366,666 A | | 11/1994 | Chuang et al. | |
| 5,407,646 A | | 4/1995 | Smith et al. | |
| 5,439,509 A | * | 8/1995 | Spink et al. | ..................... 95/166 |
| 5,605,655 A | | 2/1997 | Ishihara et al. | |

(Continued)

FOREIGN PATENT DOCUMENTS

JP 2001293330 A 10/2001
RU 2259870 C1 9/2005

OTHER PUBLICATIONS

Duan et al., "Mass transfer of SO2 to alkaline solution accompanied by second-order chemical reaction in venturi scrubber," ACS, Division of Environmental Chemistry—Preprints of Extended Abstracts 46(1) 2006. p. 104, 231st ACS National Meeting, Atlanta, GA 2006.

(Continued)

*Primary Examiner* — Duane Smith
*Assistant Examiner* — Pankti Patel
(74) *Attorney, Agent, or Firm* — Mark R Willis

(57) ABSTRACT

Methods are disclosed for the selective absorption of gas components based on differences in their gas phase and liquid phase resistances to mass transfer. The methods advantageously utilize a gas-liquid contacting apparatus having contacting stages with co-current flow channels that can provide contacting with increased liquid phase resistance to mass transfer, for example in the spray regime such that the liquid is effectively dispersed as small droplets into the gas phase.

16 Claims, 7 Drawing Sheets

(56) References Cited

U.S. PATENT DOCUMENTS

| | | | |
|---|---|---|---|
| 5,616,290 | A | 4/1997 | Ishihara et al. |
| 5,690,708 | A | 11/1997 | Danckaarts et al. |
| 5,693,297 | A * | 12/1997 | Turner et al. ............ 423/210 |
| 5,837,105 | A | 11/1998 | Stober et al. |
| 6,001,154 | A | 12/1999 | Kotake et al. |
| 6,059,934 | A | 5/2000 | Stober et al. |
| 6,682,633 | B1 | 1/2004 | Xu et al. |
| 7,104,530 | B2 | 9/2006 | Boye |
| 7,204,477 | B2 | 4/2007 | Xu et al. |
| 7,297,651 | B2 | 11/2007 | Khattaty et al. |
| 7,424,999 | B2 * | 9/2008 | Xu et al. ................ 261/97 |
| 2010/0230830 | A1 * | 9/2010 | Farsad et al. ............ 261/20 |
| 2010/0319539 | A1 * | 12/2010 | Neumann et al. ............ 95/149 |

OTHER PUBLICATIONS

Nasr et al., "Performance of a venturi jet scrubber for H2S removal by iron-complex solutions," Chemical Engineering & Technology (ISSN 0930-7516) V1I8 N.3 166-70 Wiley-VCH, Jun. 1995.

Kuzmin et al., "Vortex centrifugal bubbling reactor," Chemical Engineering Journal, 107:55-62 (2005).

Weiland, "Tray hydraulic operating regimes and selectivity," Optimized Gas Treating, Inc., Paper presented at Laurence Reid Gas Conditioning Conference, Feb. 2009, Gas Processors Assoc. Annual Convention, 2009 and Spring AIChE meeting, 2009, 10 pages.

* cited by examiner

SELECTIVE ABSORPTION OF GAS COMPONENTS IN CO-CURRENT CONTACTING APPARATUSES

FIELD OF THE INVENTION

The invention relates to methods and apparatuses for selectively absorbing, from a feed gas, a gas component having a low liquid phase resistance to mass transfer relative to its gas phase resistance to mass transfer. Gas-liquid contacting, preferably in the spray regime, is carried out in co-current flow channels of various contacting stages.

DESCRIPTION OF RELATED ART

A significant objective throughout chemical and refining technologies is the improved efficiency of contacting between gas and liquid phases. Currently, there are a wide variety of multi-phase reaction and separation processes which can benefit from an enhanced or modified rate of gas-liquid mass transfer with respect to one or more components in gas or liquid feeds. These processes typically employ any of a wide range of conventional gas-liquid contacting devices. Such devices include fractionation trays and packings that improve gas-liquid contacting at a plurality of stages within a vessel. These devices are commonly used, for example, in the selective absorption, into the liquid phase, of impurities contained in the gas phase. Other commercially significant applications for these contacting devices include distillation processes for separating components, into either the rising gas phase or falling liquid phase, depending on their relative volatility.

While the overall flow between phases in selective absorption or fractional distillation columns is generally countercurrent, many types of conventional gas-liquid contacting devices used for contacting stages within these vessels may induce localized cross flow, co-current flow, or other flow orientations between the contacting phases. Contacting stages utilizing parallel flow trays, for example, are described in U.S. Pat. No. 5,223,183; U.S. Pat. No. 5,318,732; and U.S. Pat. No. 7,204,477. Those utilizing co-current contacting are described, for example, in U.S. Pat. No. 6,682,633; U.S. Pat. No. 5,837,105; U.S. Pat. No. 6,059,934; and U.S. Pat. No. 7,424,999. The use of an alternative gas-liquid contacting device, which creates a vortex centrifugal bubbling layer that achieves high interfacial area per unit volume between a gas and a liquid is described in Kuzmin, A. O. et al., "Vortex centrifugal bubbling reactor" CHEM. ENG. JOURNAL 107: 55-62 (2005) and in Russian Patent RU 2259870.

In the art of gas processing, numerous industrial gas streams are treated, by contacting them with a liquid absorbent or solvent, to remove acid gas contaminants that would otherwise be released into the environment as harmful, corrosive, and polluting emissions. In the case of synthesis gas (syngas) produced from coal, the gasification product containing predominantly hydrogen ($H_2$) and carbon monoxide (CO) normally generally includes minor amounts of the acid gases carbon dioxide ($CO_2$) and $H_2S$. Likewise, for natural gas extracted from currently developed gas fields, the valuable methane is also normally contaminated with $CO_2$, $H_2S$, and other impurities. Liquid chemical solvent absorption systems are used to absorb unwanted contaminants, such as acid gases, by chemically reacting them with the selectively dissolved product. Otherwise, physical solvents may be used to promote physical absorption of an impurity without reaction, based on its high equilibrium solubility at its partial pressure in an impure mixture (i.e., a higher Henry's law constant).

In these "wet" liquid systems, the solvent absorption (and also the solvent regeneration, for example, by heating in the case of a physical absorbent) are usually carried out in columns containing packing, bubble plates, or other gas-liquid contacting devices, as discussed above, to improve the efficiency of mass transfer between phases. Although in some applications, high removal efficiency of several or all contaminants (e.g., all acid gas components) is the desired outcome, there are other applications in which the selective removal of one component over another is commercially advantageous. For example, the selective removal of $H_2S$ from a coal-derived syngas stream containing both $H_2S$ and $CO_2$, as discussed above, is desired for electrical power generation in an Integrated Gasification Combined Cycle (IGCC) operation. The selective removal of $H_2S$ from a feed gas containing both $H_2S$ and $CO_2$ may be desired in other situations in which the maximum enrichment of either $CO_2$ or $H_2S$ in an effluent is desired. For example, a feed with the highest possible concentration of $H_2S$ is beneficial for sulfur recovery in a Claus unit.

In the case of exemplary gases containing both $CO_2$ and $H_2S$ as acid gases, the rate of chemical absorption of $H_2S$ into a chemical solvent such as an organic amine is relatively high and controlled mainly by the gas phase resistance to mass transfer, while the rate of absorption of $CO_2$ into the same solvent is relatively low and controlled mainly by the liquid phase resistance to mass transfer. Therefore, while the absorption of both acid gas components at equilibrium may be essentially complete at sufficient liquid solvent/feed gas ratios, it is still possible to exploit, using particular gas-liquid contacting strategies, differences in the phase mass transfer resistances to selectively absorb one component over another.

For example, Weiland, R. reports that columns containing conventional contacting trays and operating under the typical froth regime, with gas dispersed through a continuous liquid phase, are typically used to achieve high absorption efficiency of both $CO_2$ and $H_2S$. "Tray Hydraulic Operating Regimes and Selectivity," OPTIMIZED GAS TREATING, INC. (2009). However, by substantially reducing liquid loads to operate in the spray regime, the $H_2S$ is more selectively absorbed into the chemical solvent while the $CO_2$ is rejected to a greater extent into the product gas exiting the column. The reason for the dramatic difference in selectivity to $H_2S$ resides in the formation of small liquid droplets in the spray regime that act as nearly rigid spheres with an extremely small liquid phase mass transfer coefficient. The absorption of $CO_2$ is greatly inhibited relative to the absorption of $H_2S$, since the overall mass transfer rate of $CO_2$ is controlled by its liquid phase resistance to mass transfer, as noted above.

Although in theory columns containing trays and other conventional gas-liquid contacting devices functioning in the spray regime may be operated to selectively absorb different gas components based on differences in their relative gas and liquid phase mass transfer coefficients, this requires a significant departure from the design operation. For example, in the spray regime the capacity of the trays is greatly reduced, and in some cases it is not even possible to force a column to operate in the spray regime due to insufficient weir length.

SUMMARY OF THE INVENTION

The present invention is associated with the discovery of methods for the selective absorption of gas components based on differences in their gas phase and liquid phase resistances to mass transfer. The methods advantageously utilize a gas-liquid contacting apparatus having contacting stages with co-current flow channels that can provide contacting with increased liquid phase resistance to mass transfer, for example in the spray regime such that the liquid is effectively dispersed as small droplets into the gas phase. Contacting in this manner with gas and liquid moving in the same upward direction thereby promotes the selective absorption of a component with a relatively low liquid phase resistance to mass transfer. Also, the gas-liquid contact time in the co-current flow channels at each contacting stage is short, thereby further impeding absorption of a component with a relatively high liquid phase resistance to mass transfer. The methods are particularly applicable to the selective absorption of $H_2S$ from a feed gas comprising both $H_2S$ and $CO_2$ acid gas components. The apparatus, comprising co-current flow channels, operates with contacting in the spray regime, and capacity is increased because of gas-liquid separation devices (e.g., demisters) at each contacting stage for enhancing separation of the phases. In contrast, columns utilizing various conventional contacting stages cannot be operated in this manner without significantly reducing their capacity and/or performing sub-optimally in other respects.

Accordingly, embodiments of the invention are directed to methods for selectively absorbing a first gas component from a feed gas comprising both the first gas component and a second gas component. The liquid phase resistance to mass transfer of the first gas component is less than its gas phase resistance to mass transfer, whereas the liquid phase resistance to mass transfer of the second component is greater than its gas phase resistance to mass transfer. These differences in relative resistances to liquid phase and gas phase mass transfer are effectively exploited by contacting the feed gas with a fresh absorbent in a co-current gas-liquid contacting apparatus operating in the spray regime. In particular, the apparatus comprises a plurality of stages, each having at least one contacting module comprising at least one liquid downcomer. The liquid downcomer has an outlet proximate at least one co-current flow channel. For example, an outlet in a lower portion of the liquid downcomer may coincide with the axial position of an inlet in a lower portion of co-current flow channel, in which the contacting gas and liquid phases of a particular contacting stage flow co-currently upward from the inlet to the outlet of the flow channel, as described in greater detail below.

Other embodiments of the invention are directed to methods for selectively absorbing $H_2S$ from a feed gas (e.g., coal-derived syngas) comprising both $H_2S$ and $CO_2$. The methods comprise contacting the feed gas with a fresh absorbent (e.g., comprising an alkanolamine) in a gas-liquid contacting apparatus, as discussed above, comprising stages having co-current flow channels.

These and other embodiments relating to the present invention are apparent from the following Detailed Description.

Figure 1:
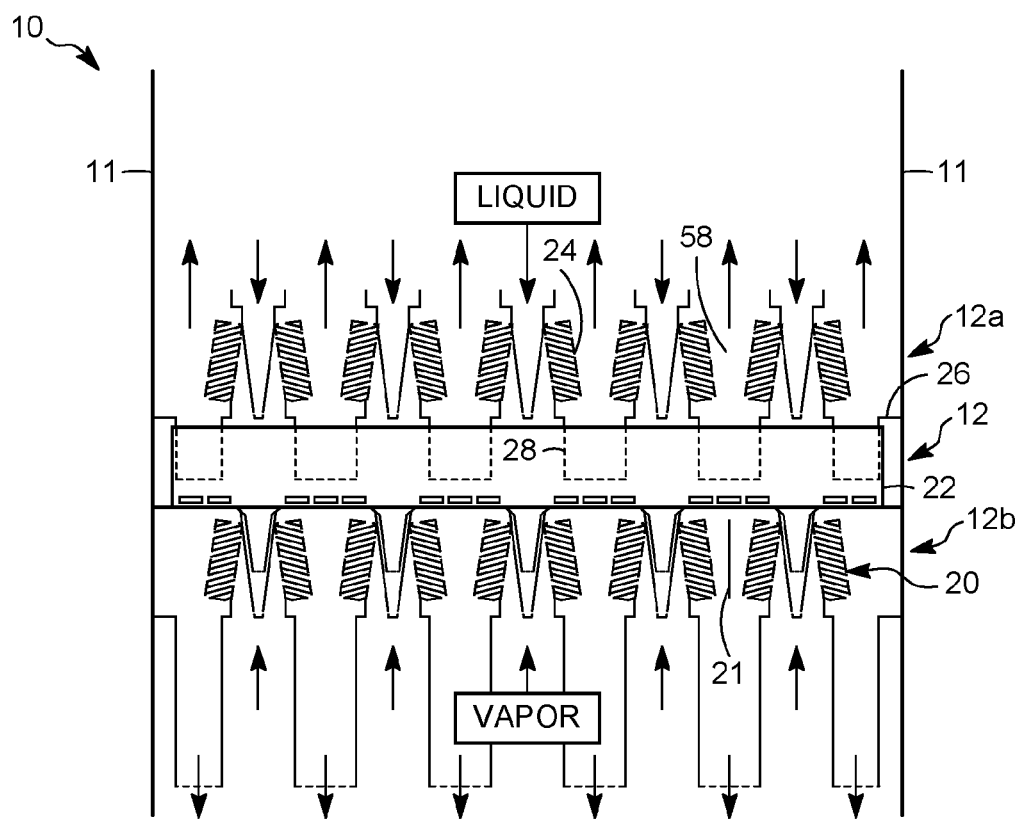
FIG. 1 is a cross-sectional schematic of a representative gas-liquid contacting apparatus comprising contacting stages with contacting modules.

The same reference numbers are used to illustrate the same or similar features throughout the drawings. The drawings are to be understood to present an illustration of the invention and/or principles involved. As is readily apparent to one of skill in the art having knowledge of the present disclosure, selective absorption methods, as well as gas-liquid contacting apparatuses used in these methods, according to various other embodiments of the invention will have configurations and components determined, in part, by their specific use.

DETAILED DESCRIPTION

As discussed above, representative methods according to embodiments of the present invention are directed to the selective absorption, into a liquid absorbent or solvent, one component over another component of a feed gas. In particular, the methods exploit differences of components of a feed gas (e.g., acid gas contaminants) in terms of their phase resistances to mass transfer, in carrying out the selective absorption by contacting the feed gas and liquid absorbent in co-current flow channels of contacting modules. Contacting is preferably carried out in this manner in the spray regime. A particular gas-liquid contacting apparatus, which promotes the desired formation of small liquid droplets that are dispersed (or sprayed) in the gas phase, has a plurality of stages, each with at least one contacting module, as described in greater detail below, for co-current contacting between the gas and liquid phases entering and exiting the stages.

An exemplary application is in the selective absorption of $H_2S$ from a feed gas comprising both $H_2S$ and $CO_2$. In the absorption of acid gases into a liquid phase, the component $H_2S$ generally has a lower liquid phase resistance to mass transfer than its gas phase resistance to mass transfer, $CO_2$, on the other hand, has a higher liquid phase resistance to mass transfer than its liquid phase resistance to mass transfer. The overall liquid side mass transfer coefficients of $H_2S$ and $CO_2$ are therefore said to be governed, respectively, by each component's gas phase and liquid phase resistance to mass transfer into the liquid absorbent. While $H_2S$ and $CO_2$ provide specific examples, representative components of the feed gas, which may be selectively absorbed into, or selectively rejected from, the liquid absorbent, are generally acid gases, although other types of gas components may be selectively absorbed/rejected provided they have the phase resistance profiles described herein.

An "acid gas" is one that dissolves in water at pH=7 to form an aqueous solution having an acidic pH. Acid gases therefore have the potential, when released into the environment, to cause acid rain that is corrosive and also detrimental to plant and animal life. Acid gases include the hydrogen halides (HCl, HBr, HF, and HI), hydrogen sulfide ($H_2S$), sulfur oxides (e.g., $SO_2$ and $SO_3$), nitrogen oxides (e.g., NO and $NO_2$), and chlorine ($Cl_2$). These acid gases originate from a wide variety of operations, for example as combustion (oxidation) products, chemical reaction byproducts, and process additive conversion products. With respect to the selective absorption of a first feed gas component over a second feed gas component (both of which may be acid gases), an absorbent or solvent refers to a liquid having the capability of dissolving both of the components to some extent, either chemically (i.e., by a chemical reaction such as an acid-base reaction) or physically (i.e., without chemical reaction but by physical compatibility). Chemical solvents include solutions of alkali metal salts or organic amines (e.g., alkanolamines such as monoethanolamine (MEA), methyldiethanolamine (MDEA), and diethanolamine (DEA)). Physical solvents include propylene carbonate, tributyl phosphate, methanol, tetrahydrothiophene dioxide (or tetramethylene sulfone).

For a given component, n, of the feed gas, the gas phase resistance to mass transfer is $$\frac{1}{k_{Gn}H_n}, \quad (1)$$

where $k_{Gn}$ is gas phase mass transfer coefficient (e.g., in units of mol/sec·m²·atm) of component n. The quantity $k_{Gn}$ is therefore the constant of proportionality between the gas phase flux of component n, $N_n^G$, across the gas-liquid interface (e.g., in units of mol/sec·m²) and the partial pressure gradient for component n, $p_{n,G}-p_{n,i}$, from the bulk gas to the gas-liquid interface (e.g., in units of atm), according to the equation:

$$N_n^G = k_{Gn}(p_{n,G}-p_{n,i}) \quad (2)$$

The quantity $H_n$ in formula (I) above is the equilibrium partition constant for component n that relates its concentration in the liquid phase (e.g., in units of mol/m³) of the gas-liquid interface to its partial pressure in the gas phase (e.g., in units of atm) of the gas-liquid interface at equilibrium, according to the equation:

$$p_{n,i} = Hc_{n,i} \quad (3)$$

Equilibrium is assumed to exist across the gas-liquid interface.

Likewise, for a given component, n, of the feed gas, the liquid phase resistance to mass transfer is $$\frac{1}{k_{Ln}}, \quad (4)$$

where $k_{Ln}$ is liquid phase mass transfer coefficient (e.g., in units of m/sec) of component n. The quantity $k_{Ln}$ is therefore the constant of proportionality between the liquid phase flux of component n, $N_n^L$, across the gas-liquid interface (e.g., in units of mol/sec·m²) and the concentration gradient for component n, $c_{n,L}-c_{n,i}$, from the bulk liquid to the gas-liquid interface (e.g., in units of mol/m³), according to the equation:

$$N_n^L = k_{Ln}(c_{n,L}-c_{n,i}) \quad (5)$$

The overall liquid phase resistance to mass transfer of component n is $$\frac{1}{K_{Ln}}, \quad (6)$$

where $K_{Ln}$ is the overall liquid phase mass transfer coefficient of component n. The overall liquid phase resistance to mass transfer is the sum of the gas phase resistance and liquid phase resistance, as shown above, according to the equation:

$$\frac{1}{K_{Ln}} = \frac{1}{k_{Gn}H_n} + \frac{1}{k_{Ln}} \quad (7)$$

Similarly, the overall gas phase resistance to mass transfer is the sum of the gas side resistance and the liquid side resistance, according to the equation:

$$\frac{1}{K_{Gn}} = \frac{1}{k_{Gn}} + \frac{H_n}{k_{Ln}} \quad (8)$$

where $K_{Gn}$ is the overall gas phase mass transfer coefficient of coefficient n.

As is apparent from equations (7) and (8) above, the overall liquid phase or gas phase resistance to mass transfer may be governed by the either (i) the gas phase (or otherwise the gas side) resistance or (ii) the liquid phase (or otherwise the liquid side) resistance. In the case of (i), a reduction in the liquid phase mass transfer coefficient, $k_{Ln}$, as is accompanied by operation in gas-liquid contacting apparatuses described herein (e.g., in the spray regime), does not necessarily have a significant impact on the overall liquid phase and gas phase resistance to mass transfer. However, in the case of (ii), a reduction in $k_{Ln}$, which increases the liquid phase (or otherwise the liquid side) resistance to mass transfer also directly impacts, and increases, the overall liquid phase and gas phase resistance to mass transfer.

In view of the above, it is possible, by utilizing particular types of gas-liquid contacting (e.g., in the spray regime) that increase the liquid phase resistance to mass transfer, to selectively absorb a component of a feed gas stream having a low liquid phase resistance to mass transfer, relative to its gas phase resistance to mass transfer. In an exemplary embodiment, as discussed above, a first component $H_2S$ in the feed gas, having these characteristics, can be preferentially absorbed into the liquid phase using an amine absorption system over a second component $CO_2$ in the feed gas. This is due to the different phase resistance profile for $CO_2$ relative to $H_2S$, namely $CO_2$ has a high liquid phase resistance to mass transfer, relative to its gas phase resistance to mass transfer, such that a reduction in the liquid phase mass transfer coefficient of $CO_2$ increases its overall resistance to mass transfer.

In preferred embodiments, therefore, a first component (e.g., $H_2S$ or other acid gas) of the feed gas has a liquid phase resistance to mass transfer that is less than its gas phase resistance to mass transfer, whereas a second component (e.g., $CO_2$ or other acid gas) of the feed gas has a liquid phase resistance to mass transfer than is greater than its gas phase resistance to mass transfer. For example, in the case of the first component, its gas phase resistance to mass transfer may exceed its liquid phase resistance to mass transfer by a factor of at least about 2, at least about 3, at least about 5, or at least about 10, for a given feed gas and liquid absorbent. Likewise, in the case of the second component, its liquid phase resistance to mass transfer may exceed its gas phase resistance to mass transfer by a factor of at least about 2, at least about 3, at least about 5, or at least about 10, for a given feed gas and liquid absorbent.

In representative gas-liquid contacting methods, the overall gas flow through the gas-liquid contacting apparatus may generally be upward and the overall liquid flow may generally be downward, even though during the actual contacting between these phases their flows may be both in the upward direction. This is possible, for example, in the case of discharging the liquid as fine droplets within a co-current flow channel of a given contacting stage to become entrained with the upwardly flowing gas phase. Disengagement of the resulting gas and liquid phases after the contacting stage then allows the disengaged gas to flow to an immediately superior (higher) contacting stage and the disengaged liquid to flow to an immediately inferior (lower) contacting stage. In a representative embodiment, the feed gas and fresh absorbent entering the gas-liquid contacting apparatus are fed, respectively, to a lower contacting stage and a higher contacting stage. According to this embodiment, the product gas and spent absorbent exiting the gas-liquid contacting apparatus are removed, respectively, from a higher contacting stage and a lower contacting stage.

The terms "lower" (or "inferior") and "higher" (or "superior") in characterizing contacting stages, refer to the relative axial positions, within the gas-liquid contacting apparatus, of the stages to which the gas and liquid inputs, respectively, to the apparatus are fed or from which the liquid and gas outputs, respectively, from the apparatus are removed. In preferred embodiments, the lower contacting stage to which the feed gas is fed and/or the spent absorbent is removed is a lowermost or bottom contacting stage of the apparatus. Likewise, in other preferred embodiments, the upper contacting stage from which the product gas is removed and/or the fresh absorbent is fed is an uppermost or top contacting stage of the apparatus. These preferred embodiments do not preclude the use of flow distributors prior to a contacting stage and/or flow collectors subsequent to a contacting stage or the use of other conventional equipment prior to or subsequent to a contacting stage (e.g., prior to a top contacting stage or subsequent to a bottom contacting stage).

FIG. 1 illustrates a co-current gas-liquid contacting apparatus according to the present invention, which is suitable for carrying out gas-liquid contacting in a spray regime as discussed above. The apparatus comprises stages within a vessel 10, which is preferably an absorber. The vessel 10 contains contacting stages 12 and optional collector/distributors. An absorber may contain from about 5 to about 250 or more contacting stages 12. Contacting modules 20 of these stages may be essentially uniform throughout the vessel, but they may also vary, for example, to accommodate changes in fluid flow rates in different parts of the column. For simplicity, only three contacting stages 12a, 12, 12b are shown in FIG. 1.

It is understood that a gas-liquid contacting apparatus such an absorber may contain several sections, with each section having numerous contacting stages. Also, there may be a plurality of feed (e.g., fresh absorbent liquid or feed gas) introductions or product (e.g., product gas or spent absorbent) withdrawals between and/or within sections. Conventional gas-liquid contacting devices (e.g., trays and/or packings) may be mixed in the same and/or different sections of the apparatus (e.g., above and/or below), as the sections having contacting stages described herein. The vessel 10 includes an outer shell 11 that typically has a cylindrical cross section.

According to FIG. 1, contacting stage 12 has a 90° rotation with respect to the directly superior and inferior stages 12a, 12b respectively, thereby distributing liquid in a direction that is orthogonal to the immediately superior stage to reduce liquid maldistribution. In other embodiments, vertically adjacent contacting stages may be oriented with different degrees of rotation that may be the same from stage to stage or may vary. Each contacting stage 12 comprises a plurality of contacting modules 20 and receiving pans 26.

Figure 2:
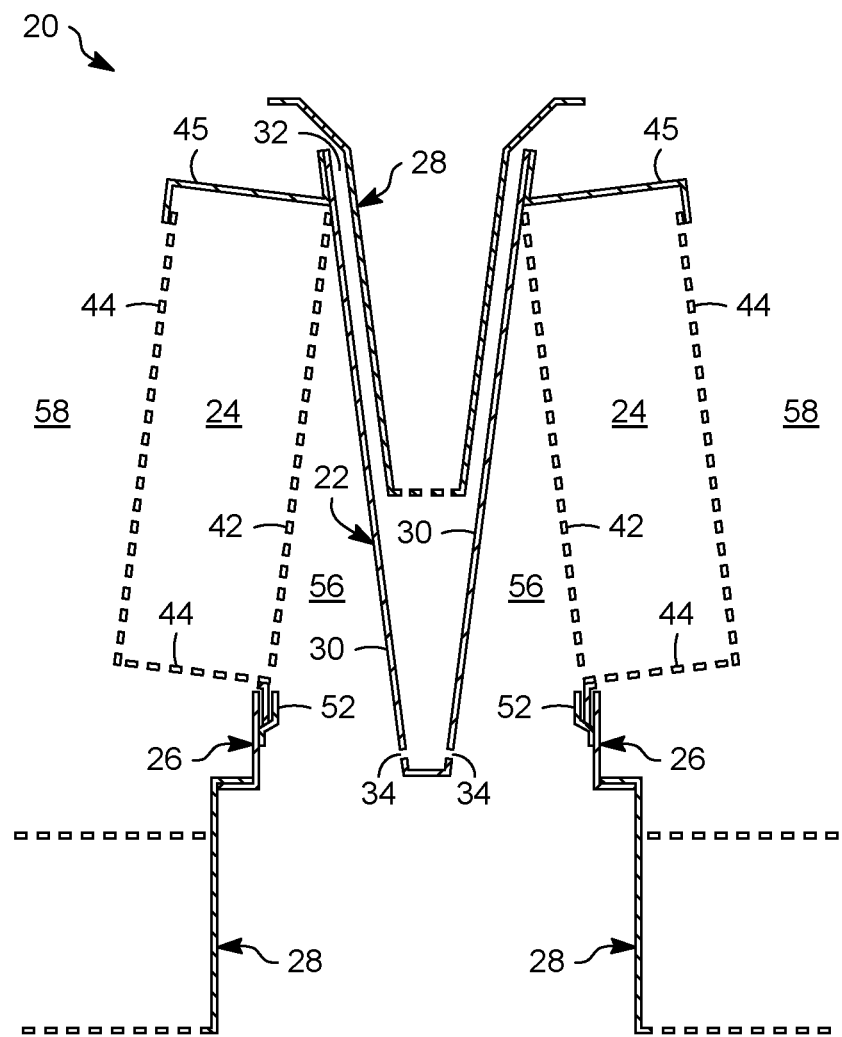
FIG. 2 is a cross-sectional schematic of a representative individual contacting module having co-current flow channels.
Figure 5:
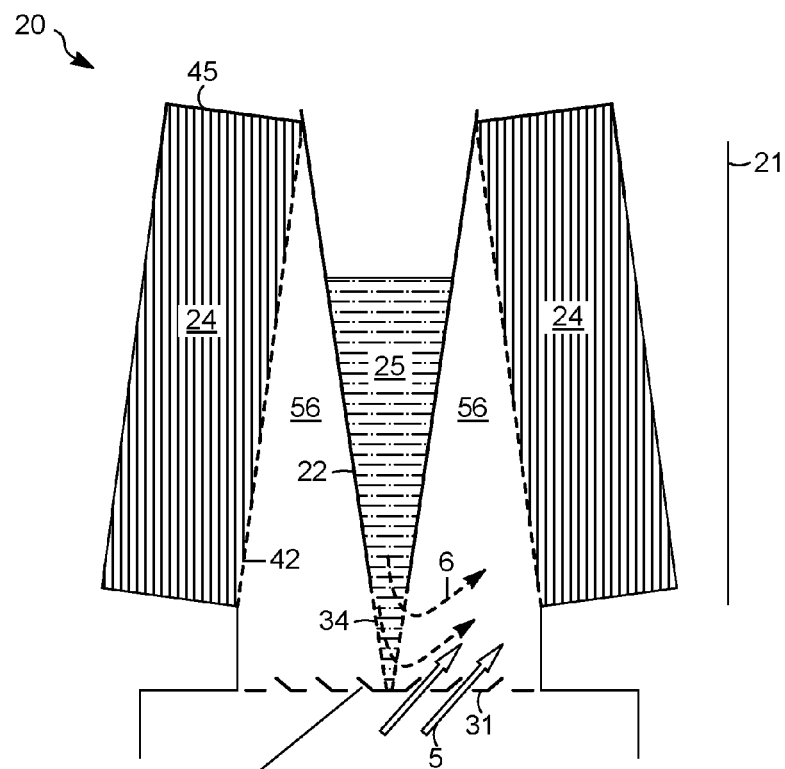
FIG. 5 is a cross-sectional schematic of a contacting module having a slotted plate as a liquid distribution device.

As shown in FIGS. 2 and 5, contacting module 20 may include a liquid distributor or liquid downcomer 22 located between a pair of gas-liquid separators or demisters 24. The liquid downcomer 22 and demisters 24 cooperate to define the co-current fluid contacting volume or co-current flow channel 56. In addition to the contacting modules 20, each stage also includes a plurality of receiving pans 26, with each receiving pan 26 having a plurality of ducts 28. An inlet 32 to the liquid downcomer 22 is configured to engage the ducts 28 of a receiving pan of the immediately superior contacting stage.

Figure 3:
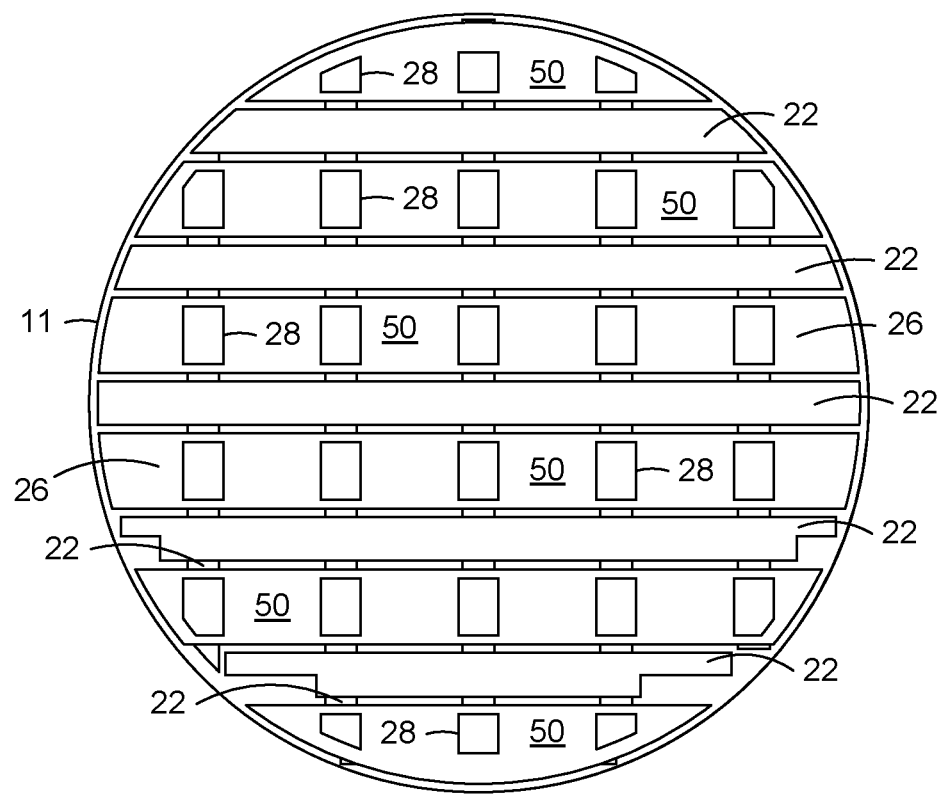
FIG. 3 is a top view of an individual contacting stage.

FIG. 3 illustrates a top view of two adjacent (inferior and superior) stages in which the demisters are not shown to more clearly show the arrangement of receiving pans 26, ducts 28, and liquid downcomers 22. At each stage, the receiving pans 26 are substantially parallel and are spaced apart across the cross sectional area of the apparatus or vessel. The liquid downcomer 22 of a contacting module 20 is located between each pair of adjacent receiving pans 26 of the same contacting stage, resulting in an alternating pattern of receiving pans 26 and modules 20. Liquid downcomers 22 and the receiving pans 26 at each stage may be supported by support rings (not shown) affixed to the inner surface of the vessel wall or outer shell 11 by welding or other conventional means. The liquid downcomers 22 and their associated receiving pans 26 may be bolted, clamped, or otherwise secured to the support ring to maintain them in a desired position or column height during operation and to prevent fluid leakage across the stages, outside of desired contacting areas.

Receiving pans located between two contacting modules, and those located between a module and the vessel shell or outer wall, are referred to as central and terminal receiving pans, respectively. Central receiving pans are thus shared by two adjacent contacting modules. In another embodiment (not illustrated) a pair of receiving pans is incorporated into each contacting module. When such modules are arranged in a substantially parallel alignment across the stage, the modules are adjacent such that there are two receiving pans between each pair of adjacent liquid downcomers. A vertical baffle 21 is optionally included between two adjacent contacting modules 20 in order to intercept gas emanating from the demisters 24 and, in general, to reduce any tendency of the emerging fluids to interfere with each other in a fluid transfer volume 58 above receiving pans 26. The vertical baffle 21 may be located between and substantially parallel to the demisters 24 of adjacent contacting modules 20.

According to FIG. 2, liquid downcomer 22 has an inlet 32 in an upper portion and an outlet 34 having one or more outlet openings in a lower portion. Two sloped liquid downcomer walls 30 taper the liquid downcomer 22 in the downward direction. The bottom of the substantially V-shaped liquid downcomer 22 near outlet 34 may be pointed, curved, or flat as shown in FIG. 2. Alternative embodiments having liquid downcomers of various different shapes, such as stepped, or sloped and stepped, are possible. In further embodiments the cross sectional shape of the liquid downcomer may be rectangular (e.g., square), or it may be curved, irregular, or otherwise configured to define a co-current flow channel having a geometry desired for liquid delivery to, and gas-liquid contacting within, the co-current flow channel. A V-shaped liquid downcomer, as shown, provides a combination of a large contacting volume between the demisters 24 and liquid downcomer walls 30 in the lower portion of each stage 12 and a large liquid downcomer inlet 32 in the upper portion for accommodating enlarged ducts 28 and increasing liquid handling capability.

The liquid downcomer outlet 34 generally has a plurality of slots, perforations, or other types of openings arranged in one or more rows near the bottom of the liquid downcomer 22. The liquid downcomer openings may be located in the walls 30 and/or the bottom of the liquid downcomer 22. In operation, a liquid level 25, as shown in FIGS. 5-8, in the liquid downcomer 22 provides a seal to prevent the ascending gas from entering the liquid downcomer through the outlets 34. The openings of liquid downcomer outlet 34 are preferably distributed along the length of the liquid downcomer 22 and they may be arranged such that the openings are varied in size or number or eliminated in the portions of the liquid downcomer 22 that are above an inferior liquid downcomer, to help prevent liquid from flowing directly from one liquid downcomer into an inferior liquid downcomer.

Demisters 24 generally run substantially along the length of liquid downcomer 22 in rows on either side. Rows of demisters may be assembled from a plurality of individual demisters 24 that include male and female end plates to form seals between the units and substantially prevent fluid leakage through the junction. Other ways to join demisters to form rows include the use of suitable fasteners such as bolts, clips, pins, clamps, or bands. Mechanisms such as a male and female tab and slot combination can provide advantages for quick assembly and disassembly. Welding or gluing is also possible. The modular configuration of the demisters 24 allows a fabricator to produce them in one or a small number of standard sizes to be assembled into demister rows of varying length. Some custom-sized demisters 24 may be required for particularly short demister rows or to match the length of a liquid downcomer 22 depending on the dimensions of the apparatus and the variety of standard size demisters available. The modular design has the further advantage of easing the assembly of the contacting module 20 since the individual demisters 24 are lighter than an entire row of demisters. However, according to some embodiments, a demister row may consist of a single demister.

Demisters 24 are used to de-entrain liquid droplets from a gas stream. One example is a mist eliminator, such as a vane type demister having various channels and louvers such that the fluid stream passing through the demister must undergo several changes in direction, forcing entrained liquid droplets to impact portions of the separation structure and flow downward to the bottom of the demister. Examples separation structures for demisters (or gas-liquid separation devices) are mesh pads or woven threads. Combinations of these structures can also be used. Many possible variations in the design of the separating structures in demisters are possible, the important consideration being the effectiveness of these structures in separating entrained liquid from a flowing gas stream. This effectiveness is thought to correlate with the number of obstructions in the fluid flow which cause liquid droplets to impact a solid surface. Structures having numerous dead ends may lead to the formation of relatively quiescent regions, also promoting liquid separation.

As shown in FIG. 2, various optional elements may cooperate with and/or be incorporated into the demister 24 to further improve the performance and/or structural integrity of the overall apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister 24. Other non-limiting examples of flow manipulators for demister 24 include expanded metal, porous solids, mesh pads, screens, grids, mesh, profile wire screens, and honeycombs. It has been found that the fractional open area of the flow manipulators affect both separation efficiency and pressure drop of the demister 24. The fractional open area of the flow manipulators may vary on different sides and on the same side of the demister to optimize the separation efficiency and pressure drop of the demister 24. Various types of flow manipulators may be used in a single demister. In other embodiments, flow manipulators are not used on some or any of the inlet and outlet surfaces of the demister.

The perforated inlet plate 42 or other flow manipulator at an inlet surface of demister 24 is proximate the liquid downcomer 22. The perforated outlet plate 44 is proximate the demister outlet surface, opposite the inlet surface. The perforated outlet plate 44 may also extend along the bottom of demister 24. The imperforate top plate 45 prevents liquid from leaving the demister 24 directly from the top and increases the gas-liquid separation efficiency. The imperforate top plate 45 may have bent strips on both sides, one extending along liquid downcomer wall 30 for attaching with the wall and the other extending along the perforated outlet plate 44 of the demister 24 for connecting with the perforated outlet plate 44. It has been found that extending the imperforate top plate 45 down a distance from the top of the perforated outlet plate 44 also improves gas-liquid separation efficiency. The distance of this extension is generally from about 5% to about 30%, and typically from about 10% to about 20%, of the height of the demister outlet surface.

The plurality of ducts 28 extend through the receiving pan 26 into the liquid downcomer inlet 32. Each of the ducts 28 that extends through a particular receiving pan 26 directs liquid into a different inferior liquid downcomer 22, as is best shown in FIG. 3. The top of the duct 28 is flush with the horizontal surface 50 of the receiving pan 26 so that liquid may flow freely from the receiving pan 26 into the duct 28 without any obstruction. In other embodiments the ducts 28 may hang from the receiving pan 26 by having a lip that rests on the horizontal surface 50 of the receiving pan when the ducts are fitted through the openings. The ducts 28 may also be mounted to the underside of horizontal surface 50 of the receiving pan 26. Any conventional means of connecting the ducts and receiving pans may be used including but not limited to hanging, bolting, welding, and pressure fitting. Gaskets and/or sealants may be used to prevent leakage between the receiving pans and the ducts. In other embodiments the ducts may be at least partially defined by the portion of the horizontal surface 50 of the receiving pan 26 that may be cut and folded or pushed out to form openings for ducts 28. Further, the top mouths of ducts 28 may be enlarged and wider than liquid downcomer inlets 32 as shown in FIG. 2 to increase liquid handling capability and reduce choking tendency at inlets of ducts 28. The sidewalls of the ducts 28 are sloped so that they fit within the liquid downcomers 22 and leave a gap for easy installation and gas venting, as shown in FIG. 2. The bottom of duct 28 is opened with one or more openings, for example a plurality of spouts or one continuous slot or single larger opening to allow liquid to flow into the liquid downcomer 22. Under normal operating conditions, ducts 28 are sealed against gas flow either dynamically by liquid in the ducts 28 or statically by liquid in the liquid downcomer 22.

The volume between the inlet surface of demister 24, which may be proximate perforated inlet plate 42, as shown in FIG. 2, and the adjacent wall 30 of the liquid downcomer 22 forms a fluid contacting volume or co-current flow channel 56. After co-current flows of gas and liquid are contacted in co-current flow channel 56, fluid contacting continues in demisters 24 before gas and liquid are separated. A perforated inlet plate 42 or other flow manipulator at the inlet surface of demister 24 improves fluid flow distribution through demister 24 and improves gas-liquid separation. Such a flow manipulator may also improve fluid contacting and mass transfer.

According to other embodiments, in lieu of perforated inlet plate 42, a porous blanket layer such as mesh pad may be used to cover the inlet surface to demister 24. The use of this porous blanket has been found to improve gas-liquid separation, especially during operation at higher gas rates. The porous blanket can be of conventional mesh material used for liquid droplet de-entrainment or so called "mist eliminators." It typically comprises very loosely woven strands forming a high surface area, low pressure drop blanket. The mesh blanket provides fine droplet coalescence and liquid distribution to demister 24. In an alternative construction, the mesh pad may be mounted in an indentation in a separation structure inside demister 24.

Figure 7:
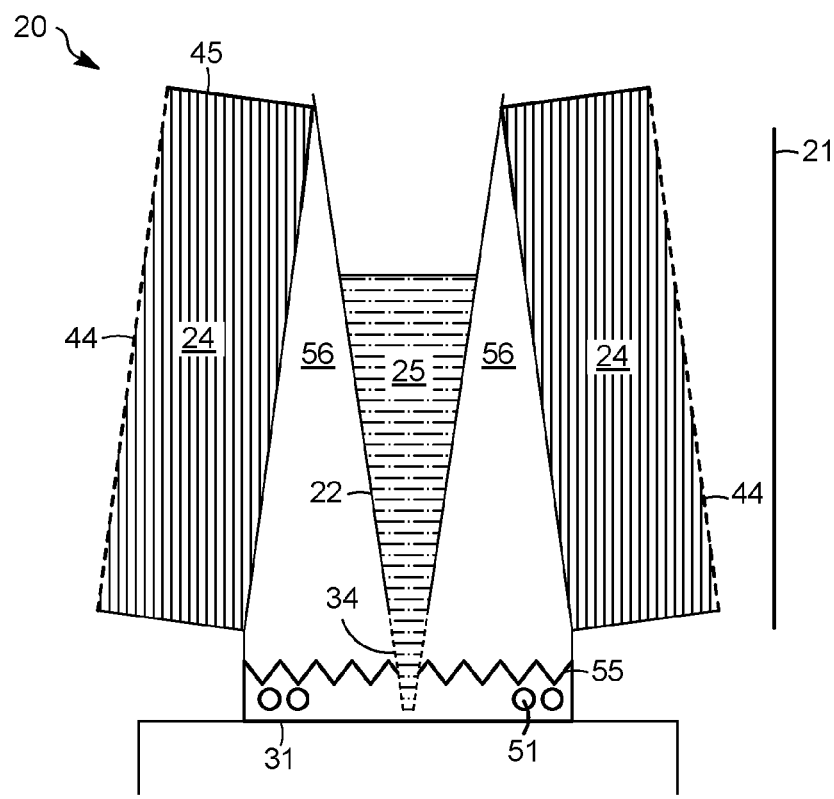
FIG. 7 is a cross-sectional schematic of a contacting module having a trough as a liquid distribution device.

FIGS. 7-8 depict further improvements in contacting modules that are beneficial in the selective absorption, for example in the spray regime, of a first feed gas component over a second feed gas component, with the components having the phase resistance profiles discussed above. In the contacting modules 20 shown in FIGS. 7 and 8, a perforated outlet plate 44 is proximate outlet surfaces of demisters 24. Including a perforated plate only at the outlet surface of demister 24 benefits the selective absorption of a first gas component over a second gas component, according to methods described herein. In particular, using perforated outlet plate 44 and not an inlet plate greatly diminishes the impact of liquid droplets with perforated plates and thereby further reduces the liquid phase mass transfer coefficient to promote this selective absorption in gas-liquid contacting with increased liquid phase resistance to mass transfer (e.g., in the spray regime), as discussed above.

The volume above receiving pan 26 and between demister rows 24 that it supports defines fluid transfer volume 58. The rows of demisters 24 may be oriented at an angle from vertical as illustrated in FIG. 2 to provide improved geometries of co-current flow channels 56, having a decreasing volume from bottom to top (to match decreasing gas flow in this volume) and fluid transfer volume 58, having an increasing volume from bottom to top (to match increasing gas flow in this volume).

The fluid flows through a contacting module 20 of an intermediate stage 12 include liquid flow from a superior stage that is directed into the liquid downcomer 22 by several receiving pans 26 of a superior stage, in cooperation with ducts 28 of this superior stage. The liquid, which forms liquid level 25, exits the liquid downcomer 22 through outlet 34 and enters the co-current flow channel 56. The upward gas velocity is sufficient in co-current flow channel 56 to entrain the entering liquid. The entrained liquid is carried upward by the rising gas to the inlet surfaces of the demisters 24. The gas and liquid are separated by the separating structures, as discussed above, within demisters 24, such that the separated gas exits demister 24 predominantly through its outlet surface (which may be proximate a perforated outlet plate 44, as shown in FIG. 2) into fluid transfer volume 58. The separated gas then continues upward to a co-current flow channel 56 of a superior contacting stage 12. The separated liquid exits the demisters 24 mainly through a bottom portion of the outlet surface and flows onto the receiving pan 26. The receiving pan 26 then directs the separated liquid into the plurality of ducts 28, such that each duct 28 of a given receiving pan directs the liquid into a different inferior liquid downcomer 22.

Aspects of the present invention are directed to other improvements in both gas and liquid flow distribution in co-current flow channels of gas-liquid contacting stages, which may be used to promote contacting in a manner that increases the liquid phase resistance to mass transfer (e.g., in a spray regime), as discussed above. Particular contacting stages of interest are those in which a pair of co-current flow channels for gas-liquid contacting and mass transfer is formed by a liquid downcomer extending between demisters.

Small droplets of liquid, discharged from near the bottom of the liquid downcomer and into the co-current flow channels, are entrained in the upward direction with upwardly flowing gas entering the flow channels from an inferior contacting stage. Thus, the contacting in the flow channels is characterized as being co-current as well as being in the spray regime. Moreover, due to high gas velocity in the co-current flow channel, gas-liquid contacting is very short, thereby providing a further advantage in terms of the selective absorption of a first gas component having a differing phase resistance profile from a second gas component, as discussed above.

Figure 4:
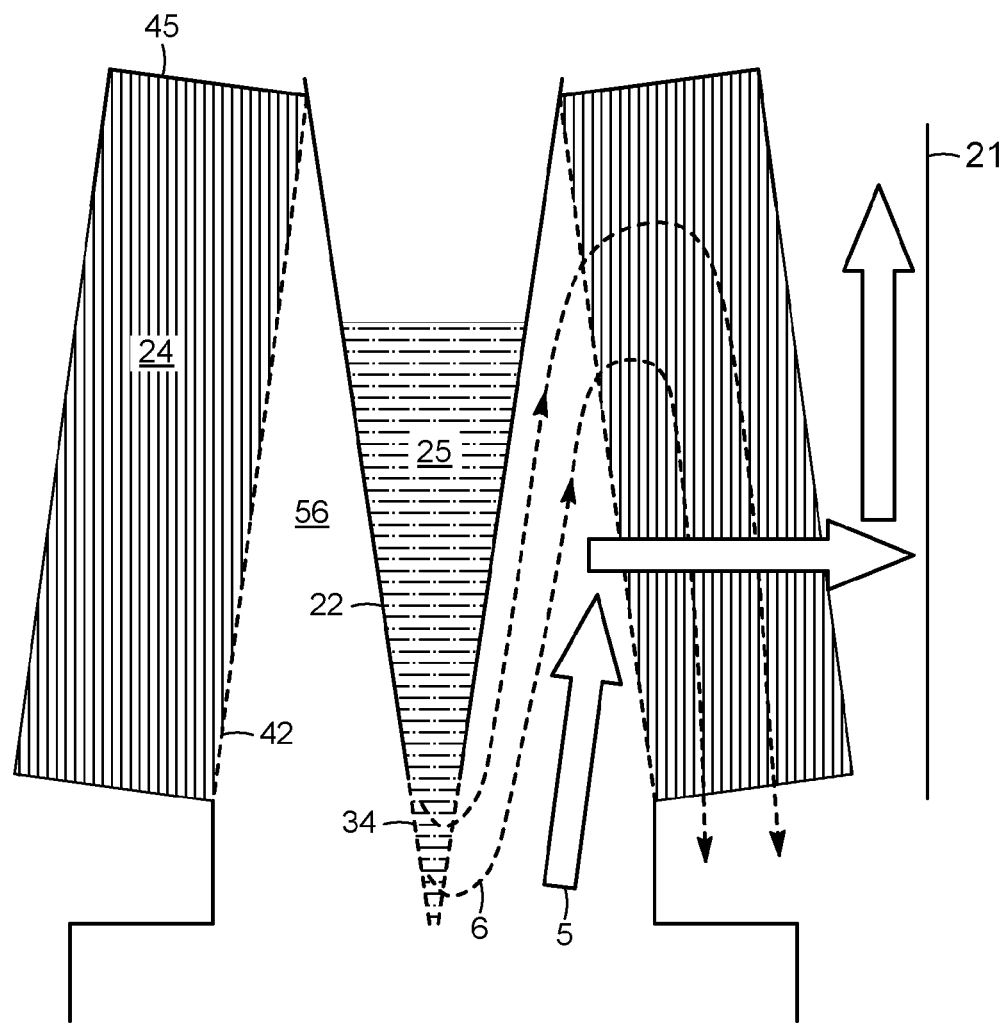
FIG. 4 depicts both liquid and gas flows through a co-current flow channel.

In such contacting stages, however, liquid introduction or discharge from the downcomer into each co-current flow channel is necessarily from only one side of the channel. Therefore, the gas:liquid ratio tends to be higher on the side of liquid introduction, relative to that on the opposite side. This non-uniformity of flow can, in some cases, reduce mass transfer efficiency, with the non-uniformity becoming more pronounced with increasing co-current flow channel width or volume and increasing gas:liquid flow ratio (i.e., relatively higher gas flow rates). FIG. 4 illustrates this non-uniformity, in which rising gas flow 5 interacts with liquid exiting outlet 34 of liquid downcomer 22, such that entrained liquid droplet flow 6 in co-current flow channel 56 is directed mainly toward liquid downcomer 22. Gas flow 5 rises predominantly on the opposite side of co-current flow channel 56, near demister 24.

FIG. 4 therefore depicts the potential for maldistribution of both gas and liquid flows, and particularly through a co-current flow channel 56 of a contacting module, with this channel 56 being defined by a liquid downcomer and the inlet surface of a demister 24. However, it can be appreciated that non-uniform liquid flow is in general a greater contributor to overall flow maldistribution than non-uniform gas flow, since it is the liquid that is initially discharged into the co-current flow channel in a non-uniform manner. Therefore, effectively addressing liquid maldistribution alone is generally sufficient to significantly improve the local variations in the gas:liquid flow ratio discussed above.

Advantageously, is has been determined that the use of a liquid distribution device, or a combination of devices, proximate outlet 34 of liquid downcomer 22 is effective in reducing the variance in the steady state, local gas:liquid ratio (e.g., volume ratio) over a horizontal cross section of co-current flow channel 56, and particularly the horizontal (e.g., rectangular or circular) cross section near outlet 34 of liquid downcomer 22, where gas and liquid are first contacted at a particular stage in a co-current manner. According to some embodiments, the liquid distribution device extends (e.g., horizontally or substantially horizontally) across a gas inlet to the co-current flow channel 56, with this gas inlet being generally proximate outlet 34 of liquid downcomer 22. The liquid distribution device may therefore extend at a horizontal position across the co-current flow channel that coincides with outlet 34 of liquid downcomer 22.

In another embodiment, the liquid distribution device can extend at a lower horizontal position within the apparatus, namely across the inlet of (e.g., on top of) a liquid downcomer of the immediately inferior stage, relative to that of the co-current flow channel 56. In this case, the liquid distribution device extends across portions of the liquid downcomer inlet that are not engaged or occupied by ducts from the immediately superior contacting stage. Thus, the liquid distribution device can be positioned in vertical alignment with outlet 34 of liquid downcomer 22 in areas not traversed by ducts 28. This helps prevent the shortcut of liquid flow from a superior liquid downcomer to the inferior liquid downcomer without contacting gas. Regardless of whether it is positioned in the same contacting module as the co-current flow channels or vertically aligned in an inferior contacting, the liquid distribution device preferably does not significantly decrease the cross-sectional area for gas flow, while still promoting liquid entrainment and improving flow distribution of the liquid, and in some cases both the gas and liquid.

Figure 5A:
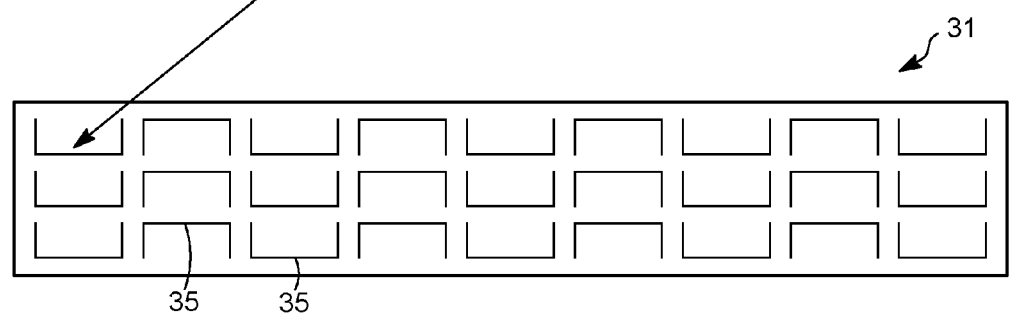
FIG. 5a is a top view of the slotted plate of FIG. 5

FIGS. 6, 6a, 7, 7a, 7b, 8, and 8a illustrate representative but non-limiting types of possible liquid distribution devices for use in contacting modules described herein. FIG. 5 depicts a contacting module 20 defining co-current flow channels 56 and having a liquid distribution device 31 that is a slotted plate proximate outlet 34 of liquid downcomer 22. Advantageously, the slotted plate has a plurality of slotted openings 35, at least some of which open towards, and direct upflowing gas to, the inlet surface of demister 24. This is shown in the particular embodiment of FIG. 5a, which is a top view of the slotted plate of FIG. 5, having adjacent rows of slotted openings 35 directed in opposite directions (half toward liquid downcomer 22 and half toward the inlet surface of demister 24) or to opposite sides of co-current flow channel 56. The liquid distribution device 31 depicted in FIGS. 6 and 6a, namely a slotted plate, therefore affects not only the distribution of liquid discharged from outlet 34 of liquid downcomer 22, but also the distribution of gas entering co-current flow channel 56. Other liquid distribution devices are designed to have a relatively greater impact on liquid distribution than gas distribution due to the need, as discussed above, to address the non-uniform discharge of liquid into co-current flow channels 56, for example from only a single side of the channel. In representative slotted plates, the slotted openings 35 may be combined with other types of openings sieve holes, valves, bubble caps, which may or may not direct upflowing gas to a side of the co-current flow channel (i.e., impart a horizontal flow component to the generally vertically flowing gas).

Figure 6:
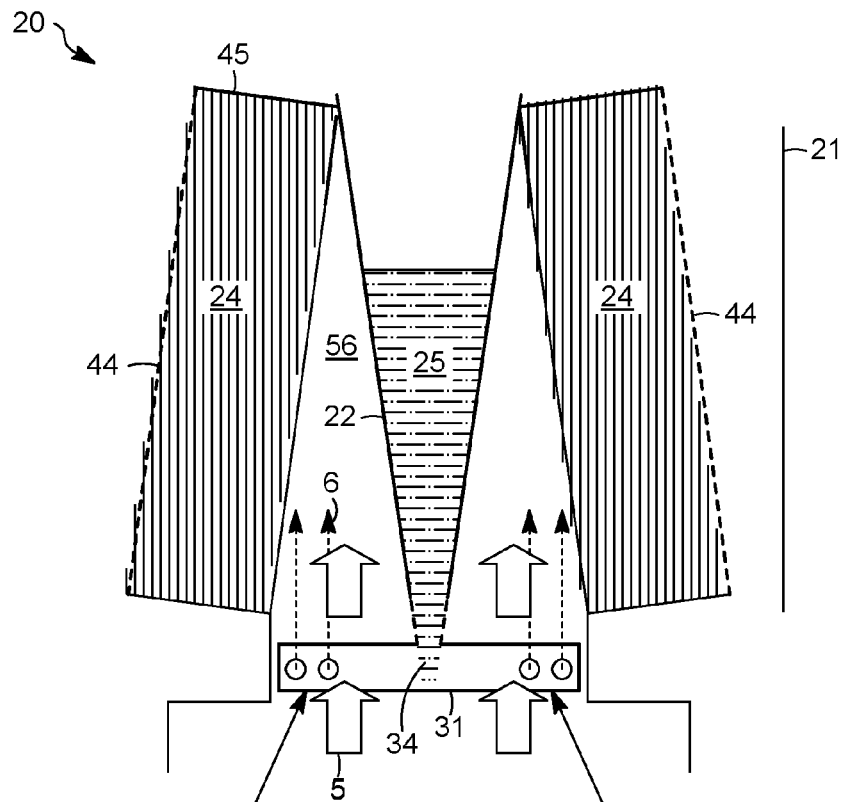
FIG. 6 is a cross-sectional schematic of a contacting module having a liquid distribution device that is engaged by a liquid downcomer outlet.
Figure 6A:
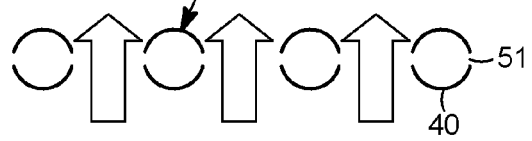
FIGS. 6a and 6b are top and end views, respectively, of the device of FIG. 6.
Figure 6B:
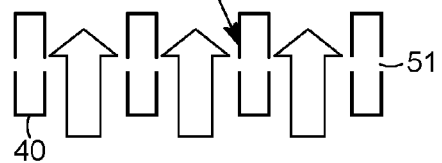
Figure 7A:
FIG. 7a is an end view of the liquid distribution device of FIG. 7.

FIG. 6 shows a contacting module 20 and FIGS. 7a and 7b depict alternate views of its liquid distribution device 31, comprising a plurality of conduits 40. Liquid distribution device 31 is located proximate, and in liquid communication with, outlet 34 of liquid downcomer 22. Conduit openings 51 or spouts from conduits 40 distribute liquid from downcomer 22 uniformly across co-current flow channel 56 in areas where upflowing gas enters the channel. The conduits 40 may have a rectangular (e.g., square), circular, or other cross-sectional shape. Upflowing gas 5 enters co-current flow channel 56 through areas or spaces between conduits 40 to carry liquid originating from outlet 34 of liquid downcomer 22, and then discharged through openings 51 of conduits 40, and provide entrained liquid flow 6 in a co-current or upflowing direction. Liquid distribution device 31 depicted in FIGS. 7, 7a, and 7b therefore acts primarily to distribute liquid uniformly across a horizontal cross section of co-current flow channel 56, which would not be achieved in the absence of such a device.

FIG. 7 shows another representative contacting module defining co-current flow channels 56. In this embodiment an open trough serves as liquid distribution device 31, with an end view of the trough provided in FIG. 7a. The trough includes notched edges 55 at its open, upper perimeter and a plurality of openings 51 located in a lower base of the trough. Again, this liquid distribution device serves to effectively distribute liquid uniformly across co-current flow channels 56.

Another improvement shown in FIGS. 7 and 8 is the use of openings 51 of liquid distribution device 31 that are biased away, in the radial direction, from outlet 34 of liquid downcomer 22. Thus, along a radial line from one end of co-current flow channel 56, aligned radially with a central axis through liquid downcomer 22, to the opposite end of co-current flow channel 56, aligned radially with an outer perimeter or edge of liquid distribution device, the open segments of this radial line, corresponding to locations of openings 51, are not spaced evenly. Rather, a greater percentage of the total open segment lengths are more than half way to opposite end of co-current flow channel 56, compared to open segment lengths that are less than half way. According to some embodiments, less than 40%, 25%, or 10% of the total open segment lengths are less than half way to the opposite end of co-current flow channel 56. Preferably, no portion of the open segment lengths is less than half way, meaning that all of the open segments, along a radial line, and preferably along all radial lines, extending from one end of co-current flow channel to the other, are more than half way to the opposite end of this channel. By biasing openings 51 away from outlet 34 of liquid downcomer 22 and consequently toward the inlet surface of demister 24, gas-liquid contact time is reduced to further inhibit, for example in the spray regime, the absorption of the second feed gas component (e.g., $CO_2$) having a liquid phase resistance to mass transfer that is greater than its gas phase resistance to mass transfer.

Overall, aspects of the invention are directed to the use of gas-liquid contacting apparatuses that can effectively provide increased liquid phase resistance to mass transfer (e.g., in the spray regime). Co-current gas-liquid contacting in such apparatuses is beneficial for selectively absorbing one or more first gas component(s), whose absorption is controlled predominantly by its gas phase resistance to mass transfer, over one or more second gas component(s), whose absorption is controlled predominantly by its liquid phase resistance to mass transfer. An exemplary embodiment is a method for selectively absorbing $H_2S$ from a feed gas comprising both $H_2S$ and $CO_2$, where the method comprises contacting the feed gas with a fresh absorbent comprising an organic amine (e.g., an alkanolamine) in a gas-liquid contacting apparatus comprising stages having co-current flow channels. Those having skill in the art, with the knowledge gained from the present disclosure, will appreciate that various changes can be made in the above gas-liquid contacting methods and apparatuses without departing from the scope of the present disclosure.

The invention claimed is:

1. A method for selectively absorbing a first gas component from a feed gas comprising both first and second gas components, the method comprising:
   contacting the feed gas with a fresh absorbent in a co-current gas-liquid contacting apparatus operating in a spray regime comprising a plurality of stages, wherein the stages have at least one contacting module comprising:
      at least one liquid downcomer,
      at least one demister, and
      at least one co-current flow channel between the at least one liquid downcomer and the at least one demister, wherein the at least one liquid downcomer includes an outlet proximate the at least one co-current flow channel,
   wherein, with respect to the first gas component, a liquid phase resistance to mass transfer is less than a gas phase resistance to mass transfer and with respect to the second gas component, a liquid phase resistance to mass transfer is greater than a gas phase resistance to mass transfer,
   wherein the contacting module further comprises a liquid distribution device proximate said outlet of said liquid downcomer, and
   wherein said liquid distribution device comprises a plate having a plurality of openings.

2. The method of claim 1, wherein the feed gas and the fresh absorbent are fed, respectively, to a bottom stage and a top stage, respectively, of the gas-liquid contacting apparatus.

3. The method of claim 1, wherein the first gas component is $H_2S$, the second gas component is $CO_2$, and the fresh absorbent comprises an organic amine.

4. The method of claim 3, wherein the organic amine is an alkanolamine.

5. The method of claim 4, wherein the alkanolamine is selected from the group consisting of monoethanolamine, methyldiethanolamine, and diethanolamine.

6. The method of claim 3, wherein the feed gas comprises synthesis gas.

7. The method of claim 1, wherein said liquid distribution device extends across a gas inlet to said co-current flow channel.

8. The method of claim 1, wherein said liquid distribution device extends across a liquid inlet of a liquid downcomer of an inferior stage.

9. The method of claim 1, wherein at least a portion of said openings are slotted openings directed away from said outlet of said liquid downcomer and toward an inlet surface of the at least one demister.

10. A method for selectively absorbing a first gas component from a feed gas comprising both first and second gas components, the method comprising:
contacting the feed gas with a fresh absorbent in a co-current gas-liquid contacting apparatus operating in a spray regime comprising a plurality of stages, wherein the stages have at least one contacting module comprising:
at least one liquid downcomer,
at least one demister, and
at least one co-current flow channel between the at least one liquid downcomer and the at least one demister, wherein the at least one liquid downcomer includes an outlet proximate the at least one co-current flow channel,
wherein, with respect to the first gas component, a liquid phase resistance to mass transfer is less than a gas phase resistance to mass transfer and with respect to the second gas component, a liquid phase resistance to mass transfer is greater than a gas phase resistance to mass transfer,
wherein the contacting module further comprises a liquid distribution device proximate said outlet of said liquid downcomer, and
wherein said liquid distribution device is in liquid communication with said outlet of said liquid downcomer and comprises a plurality of openings.

11. The method of claim 10, wherein said openings are biased away from said outlet of said liquid downcomer and toward an inlet surface of the at least one demister.

12. The method of claim 11, wherein at least a portion of said openings are from conduits having a cross-sectional shape that is circular or rectangular.

13. The method of claim 10, wherein said liquid distribution device comprises a trough comprising a plurality of openings.

14. The method of claim 13, wherein said trough is open at an upper perimeter having a notched edge and said of openings are located in a lower base of said trough.

15. The method of claim 1, wherein said contacting module further comprises
an inlet surface of the at least one demister proximate said co-current flow channel and an outlet surface superior to a receiving pan; and
at least one duct having an upper end in fluid communication with said receiving pan, and a lower end, wherein said lower end of each duct is in fluid communication with a separate liquid downcomer of an inferior stage; and
wherein said contacting module is rotated with respect to a contacting module of an inferior stage of said plurality of stages.

16. The method of claim 15, wherein said contacting module further comprises a perforated plate proximate the outlet surface of said demister.

* * * * *